US011791886B2

United States Patent
Zhang et al.

(10) Patent No.: US 11,791,886 B2
(45) Date of Patent: Oct. 17, 2023

(54) ALLOCATION OF RESOURCES FOR BEAM MANAGEMENT OPERATIONS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/454,543

(22) Filed: Nov. 11, 2021

(65) Prior Publication Data

US 2022/0158712 A1 May 19, 2022

Related U.S. Application Data

(60) Provisional application No. 63/114,897, filed on Nov. 17, 2020.

(51) Int. Cl.
*H04B 7/06* (2006.01)
*H04B 7/08* (2006.01)

(52) U.S. Cl.
CPC ......... *H04B 7/0695* (2013.01); *H04B 7/0608* (2013.01); *H04B 7/088* (2013.01)

(58) Field of Classification Search
CPC .... H04B 7/0695; H04B 7/0608; H04B 7/088; H04B 7/0404
See application file for complete search history.

(56) References Cited

U.S. PATENT DOCUMENTS

| | | | |
|---|---|---|---|
| 2018/0323845 A1* | 11/2018 | Chang | H04B 7/0626 |
| 2018/0367205 A1* | 12/2018 | Liu | H04W 24/10 |
| 2019/0068263 A1* | 2/2019 | Yu | H04L 5/0048 |
| 2019/0103908 A1* | 4/2019 | Yu | H04B 7/0695 |
| 2019/0297603 A1* | 9/2019 | Guo | H04W 72/046 |
| 2020/0107327 A1 | 4/2020 | Wang et al. | |
| 2021/0050898 A1* | 2/2021 | Yu | H04L 1/0008 |
| 2021/0153215 A1* | 5/2021 | Guan | H04B 7/0617 |

FOREIGN PATENT DOCUMENTS

WO    WO-2020222567 A1    11/2020

OTHER PUBLICATIONS

International Search Report and Written Opinion—PCT/US2021/072380—ISA/EPO—dated Mar. 9, 2022.

\* cited by examiner

*Primary Examiner* — Kenneth T Lam
(74) *Attorney, Agent, or Firm* — Harrity & Harrity, LLP

(57) ABSTRACT

Various aspects of the present disclosure generally relate to wireless communication. In some aspects, a user equipment (UE) may transmit information, based at least in part on whether a first antenna panel and a second antenna panel share baseband components, for a determination of an amount of resources to use for a beam management operation. The UE may receive, based at least in part on transmission of the information, an indication of an allocation of resources for the beam management operation. Numerous other aspects are provided.

30 Claims, 10 Drawing Sheets

ALLOCATION OF RESOURCES FOR BEAM MANAGEMENT OPERATIONS

CROSS-REFERENCE TO RELATED APPLICATION

This patent application claims priority U.S. Provisional Patent Application No. 63/114,897, filed on Nov. 17, 2020, entitled "ALLOCATION OF RESOURCES FOR BEAM MANAGEMENT OPERATIONS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for allocation of resources for beam management operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting information, based at least in part on whether a first antenna panel and a second antenna panel share baseband components, for a determination of an amount of resources to use for a beam management operation; and receiving, based at least in part on transmission of the information, an indication of an allocation of resources for the beam management operation.

In some aspects, a method of wireless communication performed by a base station includes receiving information, based at least in part on whether a first antenna panel of a UE and a second antenna panel of the UE share baseband components, for a determination of an amount of resources to use for a beam management operation; and transmitting, based at least in part on reception of the information, an indication of an allocation of resources for the beam management operation.

In some aspects, a UE for wireless communication includes a memory; and one or more processors coupled to the memory, the memory and the one or more processors configured to: transmit information, based at least in part on whether a first antenna panel and a second antenna panel share baseband components, for a determination of an amount of resources to use for a beam management operation; and receive, based at least in part on transmission of the information, an indication of an allocation of resources for the beam management operation.

In some aspects, a base station for wireless communication includes a memory; and one or more processors coupled to the memory, the memory and the one or more processors configured to: receive information, based at least in part on whether a first antenna panel of a UE and a second antenna panel of the UE share baseband components, for a determination of an amount of resources to use for a beam management operation; and transmit, based at least in part on reception of the information, an indication of an allocation of resources for the beam management operation.

In some aspects, a non-transitory computer-readable medium storing a set of instructions for wireless communication includes one or more instructions that, when executed by one or more processors of a UE, cause the UE to: transmit information, based at least in part on whether a first antenna panel and a second antenna panel share baseband components, for a determination of an amount of resources to use for a beam management operation; and receive, based at least in part on transmission of the information, an indication of an allocation of resources for the beam management operation.

In some aspects, a non-transitory computer-readable medium storing a set of instructions for wireless communication includes one or more instructions that, when executed by one or more processors of a base station, cause the base station to: receive information, based at least in part on whether a first antenna panel of a UE and a second antenna panel of the UE share baseband components, for a determination of an amount of resources to use for a beam management operation; and transmit, based at least in part on reception of the information, an indication of an allocation of resources for the beam management operation.

In some aspects, an apparatus for wireless communication includes means for transmitting information, based at least in part on whether a first antenna panel and a second antenna panel share baseband components, for a determination of an amount of resources to use for a beam management operation; and means for receiving, based at least in part on transmission of the information, an indication of an allocation of resources for the beam management operation.

In some aspects, an apparatus for wireless communication includes means for receiving information, based at least in part on whether a first antenna panel of a UE and a second antenna panel of the UE share baseband components, for a determination of an amount of resources to use for a beam management operation; and means for transmitting, based at least in part on reception of the information, an indication of an allocation of resources for the beam management operation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
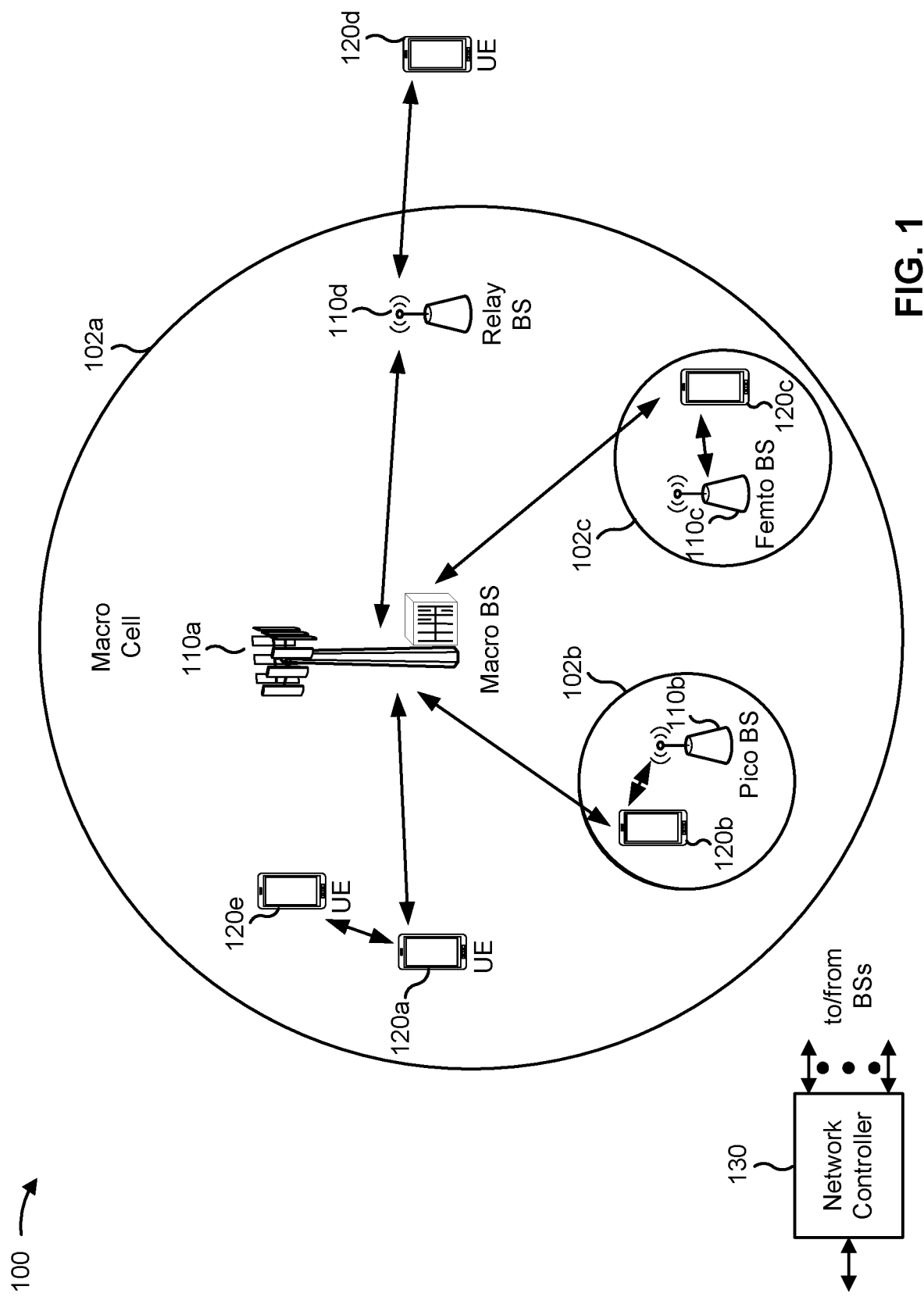
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
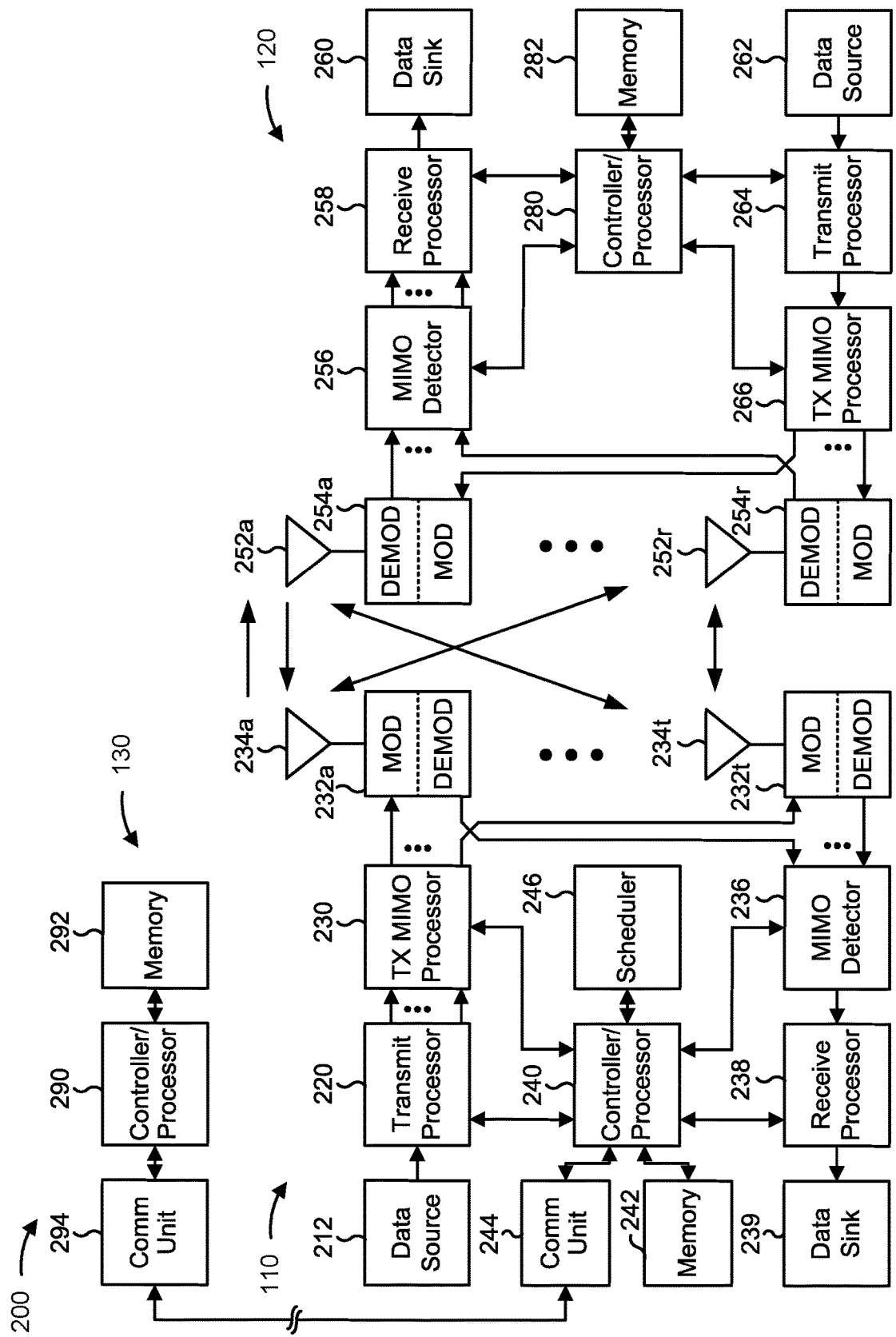
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna arrayOn the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-10).

Controller/processor 240 of base station 110, controller/processor 280 of UE 120, and/or any other component(s) of FIG. 2 may perform one or more techniques associated with allocation of resources for beam management operations, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE includes means for transmitting information, based at least in part on whether a first antenna panel and a second antenna panel share baseband components, for a determination of an amount of resources to use for a beam management operation; and/or means for receiving, based at least in part on transmission of the information, an indication of an allocation of resources for the beam management operation. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for transmitting one or more of: an indication of a number of beams associated with the first antenna panel, an indication of a number of beams associated with the second antenna panel, an indication of a recommended amount of resources for the first antenna panel, or an indication of a recommended amount of resources for the second antenna panel.

In some aspects, the base station includes means for receiving information, based at least in part on whether a first antenna panel of a UE and a second antenna panel of the UE share baseband components, for a determination of an amount of resources to use for a beam management operation; and/or means for transmitting, based at least in part on reception of the information, an indication of an allocation of resources for the beam management operation. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for determining, based at least in part on the information, an amount of resources to allocate for the beam management operation.

In some aspects, the base station includes means for determining an amount of resources to allocate for the beam management operation based at least in part on a combination of the number of antenna panels of the UE that share the baseband components and a configured amount of resources to use per antenna panel.

In some aspects, the base station includes means for receiving one or more of: an indication of a number of beams associated with the first antenna panel, an indication of a number of beams associated with the second antenna panel, an indication of an amount of resources requested for the first antenna panel, or an indication of an amount of resources requested for the second antenna panel.

In some aspects, the base station includes means for determining an amount of resources, based at least in part on the information indicating that the first antenna panel and the second antenna panel share the baseband components, to allocate for the beam management operation based at least in part on a combination of the number of beams associated with the first antenna panel and the number of beams associated with the second antenna panel.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
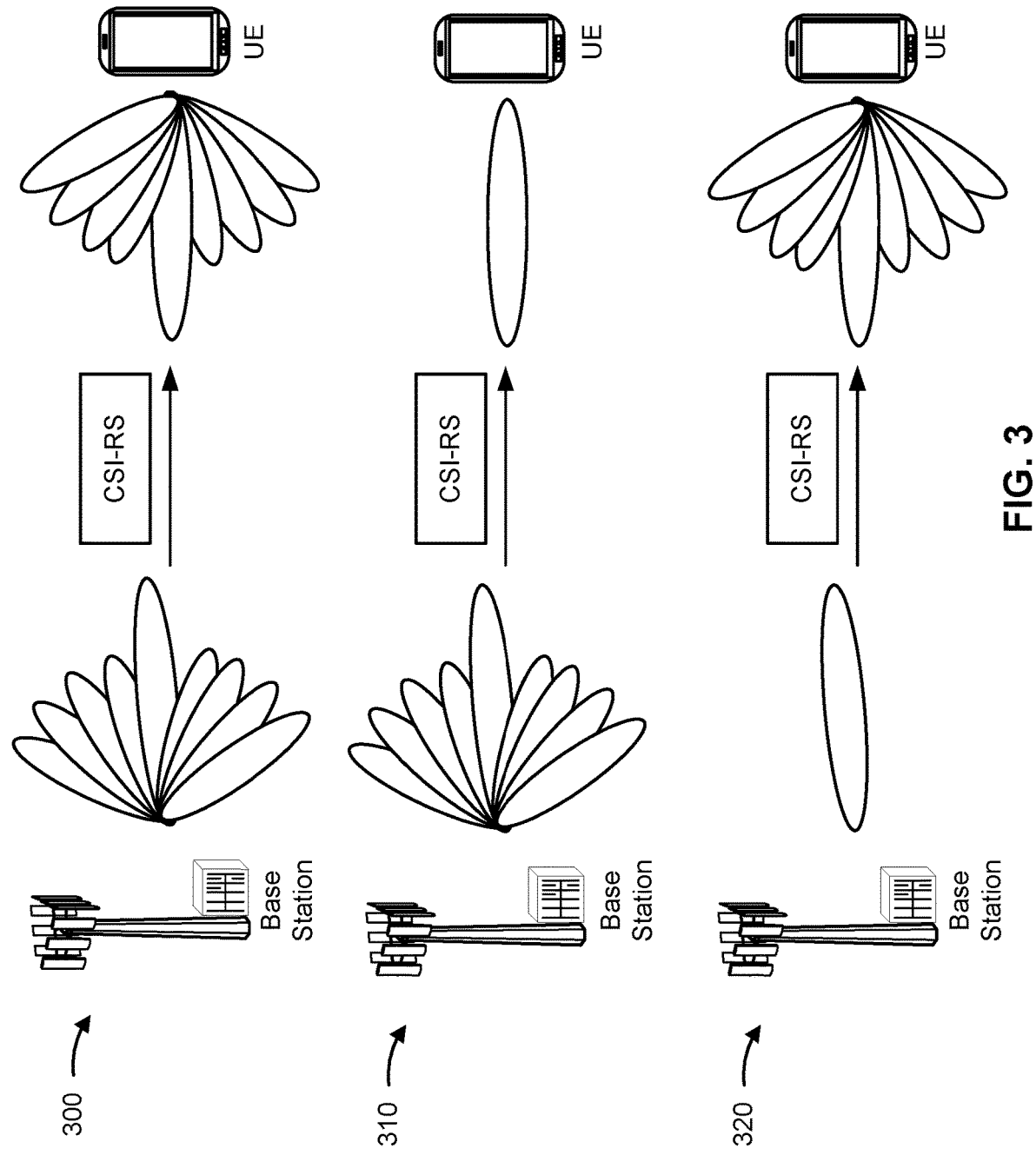
FIGS. 3 and 4 are diagrams illustrating examples of beam management procedures, in accordance with the present disclosure.

FIG. 3 is a diagram illustrating examples 300, 310, and 320 of beam management procedures (e.g., channel state information reference signal (CSI-RS) beam management procedures), in accordance with the present disclosure. As shown in FIG. 3, examples 300, 310, and 320 include a UE in communication with a base station in a wireless network (e.g., wireless network 100). However, the devices shown in FIG. 3 are provided as examples, and the wireless network may support communication and beam management between other devices (e.g., between a UE and a base station or transmit receive point (TRP), between a mobile termination node and a control node, between an integrated access and backhaul (IAB) child node and an IAB parent node, between a scheduled node and a scheduling node, and/or the like). In some aspects, the UE and the base station may be in a connected state (e.g., a radio resource control (RRC) connected state and/or the like).

As shown in FIG. 3, example 300 may include a base station and a UE communicating to perform beam management using CSI-RSs. Example 300 depicts a first beam management procedure (e.g., P1 beam management). The first beam management procedure may be referred to as a beam selection procedure, an initial beam acquisition procedure, a beam sweeping procedure, a cell search procedure, a beam search procedure, and/or the like. As shown in FIG. 3 and example 300, CSI-RSs may be configured to be transmitted from the base station to the UE. The CSI-RSs may be configured to be periodic (e.g., using RRC signaling and/or the like), semi-persistent (e.g., using medium access control (MAC) control element (MAC-CE) signaling and/or the like), and/or aperiodic (e.g., using downlink control information (DCI) and/or the like).

The first beam management procedure may include the base station performing beam sweeping over multiple transmit (Tx) beams. The base station may transmit a CSI-RS using each transmit beam for beam management. To enable the UE to perform receive (Rx) beam sweeping, the base station may use a transmit beam to transmit (e.g., with repetitions) each CSI-RS at multiple times within the same reference signal (RS) resource set so that the UE can sweep through receive beams in multiple transmission instances. For example, if the base station has a set of N transmit beams and the UE has a set of M receive beams, the CSI-RS may be transmitted on each of the N transmit beams M times so that the UE may receive M instances of the CSI-RS per transmit beam. In other words, for each transmit beam of the base station, the UE may perform beam sweeping through the receive beams of the UE. As a result, the first beam management procedure may enable the UE to measure a CSI-RS on different transmit beams using different receive beams to support selection of base station transmit beams/UE receive beam(s) beam pair(s). The UE may report the measurements to the base station to enable the base station to select one or more beam pair(s) for communication between the base station and the UE. While example 300 has been described in connection with CSI-RSs, the first beam management process may also use synchronization signal blocks (SSBs) for beam management in a similar manner as described above.

As shown in FIG. 3, example 310 may include a base station and a UE communicating to perform beam management using CSI-RSs. Example 310 depicts a second beam management procedure (e.g., P2 beam management). The second beam management procedure may be referred to as a beam refinement procedure, a base station beam refinement procedure, a TRP beam refinement procedure, a transmit beam refinement procedure, and/or the like. As shown in FIG. 3 and example 310, CSI-RSs may be configured to be transmitted from the base station to the UE. The CSI-RSs may be configured to be aperiodic (e.g., using DCI and/or the like). The second beam management procedure may include the base station performing beam sweeping over one or more transmit beams. The one or more transmit beams may be a subset of all transmit beams associated with the base station (e.g., determined based at least in part on measurements reported by the UE in connection with the first beam management procedure). The subset of all transmit beams may be relatively narrow beams compared to transmit beams used in the first beam management procedure.

The base station may transmit a CSI-RS using each transmit beam of the one or more transmit beams for beam management. The UE may measure each CSI-RS using a single (e.g., a same) receive beam (e.g., determined based at least in part on measurements performed in connection with the first beam management procedure). The second beam management procedure may enable the base station to select a best transmit beam based at least in part on measurements of the CSI-RSs (e.g., measured by the UE using the single receive beam) reported by the UE.

As shown in FIG. 3, example 320 depicts a third beam management procedure (e.g., P3 beam management). The third beam management procedure may be referred to as a beam refinement procedure, a UE beam refinement procedure, a receive beam refinement procedure, and/or the like. As shown in FIG. 3 and example 320, one or more CSI-RSs may be configured to be transmitted from the base station to the UE. The CSI-RSs may be configured to be aperiodic (e.g., using DCI and/or the like). The third beam management process may include the base station transmitting the one or more CSI-RSs using a single transmit beam (e.g., determined based at least in part on measurements reported by the UE in connection with the first beam management procedure and/or the second beam management procedure). The single transmit beam may be a relatively narrow beam compared to transmit beams used in the first beam management procedure.

To enable the UE to perform receive beam sweeping, the base station may use a transmit beam to transmit (e.g., with repetitions) CSI-RS at multiple times within the same RS resource set so that UE can sweep through one or more receive beams in multiple transmission instances. The one or more receive beams may be a subset of all receive beams associated with the UE (e.g., determined based at least in part on measurements performed in connection with the first beam management procedure and/or the second beam management procedure). The third beam management procedure may enable the base station and/or the UE to select a best receive beam based at least in part on reported measurements received from the UE (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, the UE and the base station may perform the third beam management procedure before performing the second beam management procedure, among other examples.

Figure 4:
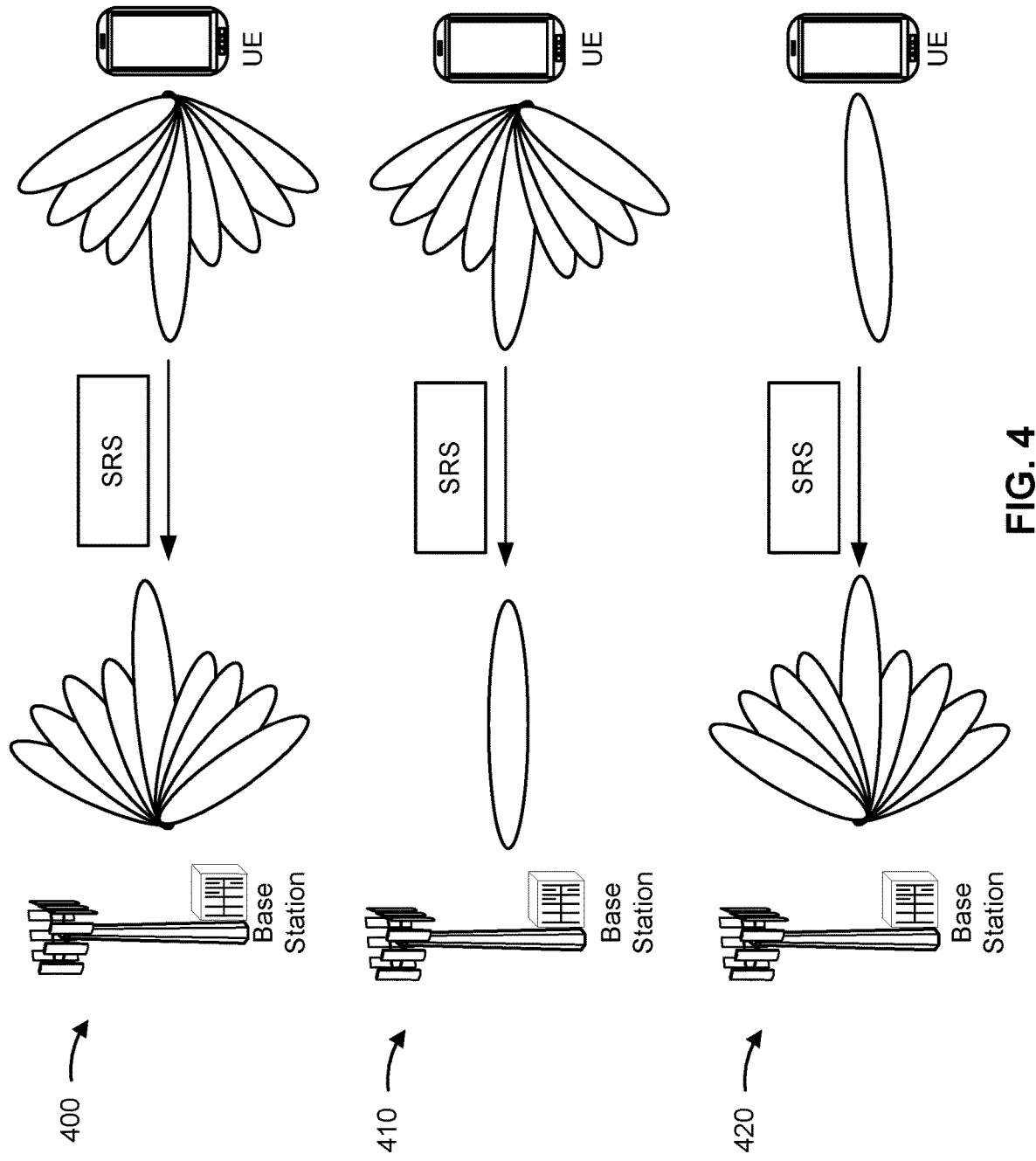

FIG. 4 is a diagram illustrating examples 400, 410, and 420 of beam management procedures, in accordance with the present disclosure. As shown in FIG. 4, examples 400, 410, and 420 include a UE in communication with a base station in a wireless network (e.g., wireless network 100). However, the devices shown in FIG. 4 are provided as examples, and the wireless network may support communication and beam management between other devices (e.g., between a UE and a base station or TRP, between a mobile termination node and a control node, between an IAB child node and an IAB parent node, and/or between a scheduled node and a scheduling node, among other examples). In some aspects, the UE and the base station may be in a connected state (e.g., an RRC connected state, among other examples).

As shown in FIG. 4, example 400 may include a base station and a UE communicating to perform beam management using reference signals, such as sounding reference signals (SRSs). Example 400 depicts a first beam management procedure (e.g., U1 beam management). The first beam management procedure may be referred to as a beam selection procedure, an initial beam acquisition procedure, a beam sweeping procedure, a beam search procedure, and/or the like. As shown in FIG. 4 and example 400, SRSs may be configured to be transmitted from the UE to the base station. The SRSs may be configured to be periodic (e.g., using RRC signaling and/or the like), semi-persistent (e.g., using MAC-CE signaling and/or the like), and/or aperiodic (e.g., using DCI and/or the like).

The first beam management procedure may include the UE performing beam sweeping over multiple transmit (Tx) beams. The UE may transmit an SRS using each transmit beam for beam management. To enable the base station to perform receive (Rx) beam sweeping, the UE may use a transmit beam to transmit (e.g., with repetitions) each SRS at multiple times within the same RS resource set so that the base station can sweep through receive beams in multiple transmission instances. For example, if the UE has a set of N transmit beams and the base station has a set of M receive beams, the SRS may be transmitted on each of the N transmit beams M times so that the base station may receive M instances of the SRS per transmit beam. In other words, for each transmit beam of the UE, the base station may perform beam sweeping through the receive beams of the base station. As a result, the first beam management procedure may enable the base station to measure an SRS on different transmit beams using different receive beams to support selection of UE transmit beams/base station receive beam(s) beam pair(s). The base station may select one or more beam pair(s) for communication between the base station and the UE. While example 400 has been described in connection with SRSs, the first beam management process may also use other types of reference signals for beam management in a similar manner as described above.

As shown in FIG. 4, example 410 may include a base station and a UE communicating to perform beam management using SRSs. Example 410 depicts a second beam management procedure (e.g., U2 beam management). The second beam management procedure may be referred to as a beam refinement procedure, a beam refinement procedure, a transmit beam refinement procedure, and/or the like. As shown in FIG. 4 and example 410, SRSs may be configured to be transmitted from the UE to the base station. The SRSs may be configured to be aperiodic (e.g., using DCI and/or the like). The second beam management procedure may include the UE performing beam sweeping over one or more transmit beams. The one or more transmit beams may be a subset of all transmit beams associated with the UE (e.g., determined based at least in part on measurements reported by the base station in connection with the first beam management procedure). The subset of all transmit beams may be relatively narrow beams compared to transmit beams used in the first beam management procedure.

The UE may transmit an SRS using each transmit beam of the one or more transmit beams for beam management. The base station may measure each SRS using a single (e.g., a same) receive beam (e.g., determined based at least in part on measurements performed in connection with the first beam management procedure). The second beam management procedure may enable the UE to select a best transmit beam based at least in part on measurements of the SRSs (e.g., measured by the base station using the single receive beam) reported by the base station.

As shown in FIG. 4, example 420 depicts a third beam management procedure (e.g., U3 beam management). The third beam management procedure may be referred to as a beam refinement procedure, a base station beam refinement procedure, a receive beam refinement procedure, and/or the like. As shown in FIG. 4 and example 420, one or more SRSs may be configured to be transmitted from the UE to the base station. The SRSs may be configured to be aperiodic (e.g., using DCI and/or the like). The third beam management process may include the UE transmitting the one or more SRSs using a single transmit beam (e.g., determined based at least in part on measurements reported by the base station in connection with the first beam management procedure and/or the second beam management procedure). The single transmit beam may be a relatively narrow beam compared to transmit beams used in the first beam management procedure.

To enable the base station to perform receive beam sweeping, the UE may use a transmit beam to transmit (e.g., with repetitions) SRS at multiple times within the same RS resource set so that base station can sweep through one or more receive beams in multiple transmission instances. The one or more receive beams may be a subset of all receive beams associated with the base station (e.g., determined based at least in part on measurements performed in connection with the first beam management procedure and/or the second beam management procedure). The third beam management procedure may enable the base station to select a best receive beam based at least in part on measurements of the SRSs of the transmit beam using the one or more receive beams.

As indicated above, FIG. 4 is provided as an example of beam management procedures. Other examples of beam management procedures may differ from what is described with respect to FIG. 4. For example, the UE and the base station may perform the third beam management procedure before performing the second beam management procedure, among other examples.

Figure 5:
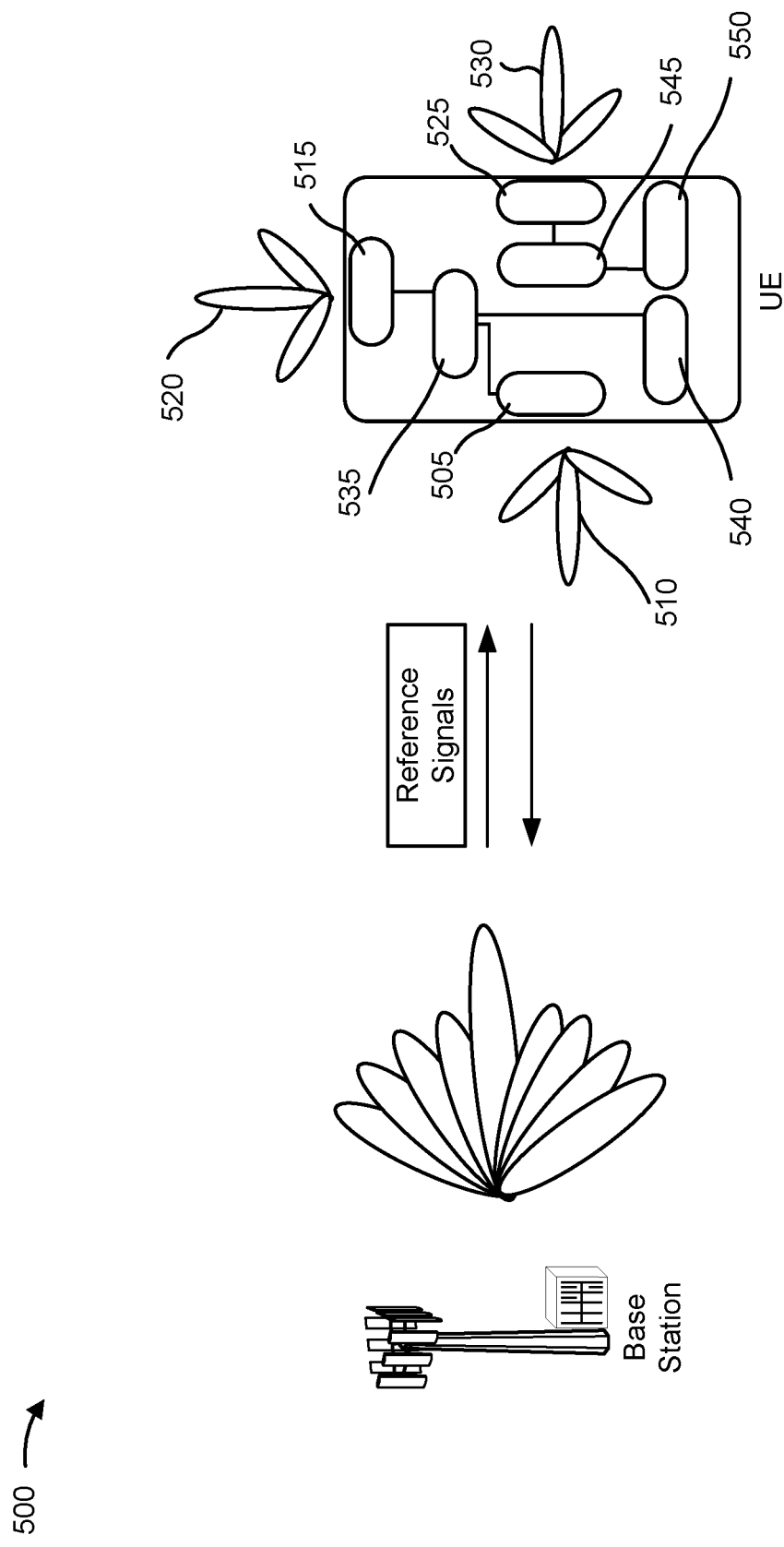
FIG. 5 is a diagram illustrating an example of communications via panels of a UE, in accordance with the present disclosure.

FIG. 5 is a diagram illustrating an example 500 of communications via panels of a UE, in accordance with the present disclosure. As shown, a UE may communicate with a base station via a wireless network (e.g., wireless network 100). The base station and the UE may perform one or more beam management operations (e.g., a beam refinement procedure for a UE beam, a beam selection procedure for a UE beam, a beam refinement procedure for a base station beam, a beam selection procedure for a base station beam). The base station and the UE may communicate one or more reference signals (e.g., SRSs, CSI-RSs, and/or SSBs, among other examples) associated with the one or more beam management operations The UE may be configured to receive signals and/or transmit signals using one or more antenna panels, with each antenna panel being associated with a respective set of one or more beams. For example, the UE may receive signals and/or transmit signals using a first antenna panel 505 that is associated with a first set 510 of beams, using a second antenna panel 515 that is associated with a second set 520 of beams, and/or using a third antenna panel 525 that is associated with a third set 530 of beams, among other examples.

In some aspects, an antenna panel (e.g., first antenna panel 505, second antenna panel 515, and/or antenna panel 525, among other examples) may include, or may be included in, an antenna group, a set of antenna elements, and/or an antenna array, among other examples. An antenna panel may include one or more antenna elements. An antenna panel may include a set of coplanar antenna elements and/or a set of non-coplanar antenna elements. An antenna panel may include antenna elements within a single house component and/or antenna elements withing multiple housing elements. An antenna panel may include one or more antenna elements coupled to one or more transmission and/or reception components, such as one or more components of FIG. 2.

One or more of the antenna panels may share one or more baseband components for receiving and processing received signals and/or for processing and transmitting signals. For example, antenna panel 505 and antenna panel 515 may share baseband components including an intermediate frequency (IF) to baseband (BB) converter 535 and/or one or more BB logic devices 540 to convert the signals to data and/or control information, among other examples. One or more additional antenna panels may share one or more additional baseband components and/or may be associated with dedicated (e.g., non-shared) baseband components. For example, antenna panel 525 may be associated with dedicated baseband components, such as IF to BB converter 545 and/or BB logic devices 550.

For some UEs, the UE may be unable to simultaneously transmit or receive signals via multiple antenna panels that share baseband components. For some UEs, the UE be able to simultaneously transmit and/or receive signals via multiple antenna panels that do not share baseband components.

As indicated above, FIG. 5 is provided as an example. Other examples may differ from what is described with respect to FIG. 5.

Beam management procedures may consume network resources for transmissions of repetitions of reference signals. In some networks, a relatively high amount of network resources consumed for beam management procedures may result in an increased periodicity (e.g., an increased interval between iterations) of beam management procedures to reduce a portion of network resources used for the beam management procedures. An increased periodicity may result in communicating with one or more beams that were selected using stale measurements of reference signals, which may increase communication errors and/or reduce spectral efficiency (e.g., based at least in part on using an inefficient MCS and/or an inefficient allocation for pilots, among other examples), among other examples.

In some aspects described herein, a base station (e.g., base station 110) may determine an amount of resources to allocate for a beam management operation based at least in part on a capability of a UE (e.g., UE 120) to simultaneously transmit and/or receive reference signals via multiple antenna panels. For example, a UE may be configured with a first antenna panel and a second antenna panel that share baseband components and a third antenna panel that does not share the same baseband components. The UE may transmit information for a determination of an amount of resources to use for the beam management operation that is based at least in part on whether antenna panels of the UE share baseband components. For example, the information may include an indication that the first antenna panel (e.g., associated with a first antenna panel identifier) and the second antenna panel (e.g., associated with a second antenna panel identifier) share baseband components, an indication of a number of antenna panels that share baseband components, and/or an indication of a recommended amount of resources for the beam management operation.

The base state may determine an amount of resources based at least in part on the information, which is associated with a capability of the UE to simultaneously transmit and/or receive reference signals using the third antenna panel and either the first antenna panel or the second antenna panel. The base station may also determine the amount of resources to allow for the UE to transmit and/or receive the reference signals using the first antenna panel and the second antenna panel using time division multiplexing (e.g., non-simultaneous transmission and/or reception).

Based at least in part on the base station allocating an amount of resources for beam management that is based at least in part on whether the antenna panels of the UE share baseband components and/or whether the UE is configured to simultaneously transmit and/or receive reference signals via different antenna panels, the base station may conserve network resources allocated for beam management operations. This may facilitate a decreased periodicity (e.g., a decreased interval between iterations) of beam management procedures. An decreased periodicity may result in communicating with one or more beams that were selected using updated measurements of reference signals, which may reduce communication errors and/or improve spectral efficiency (e.g., based at least in part on using an efficient MCS and/or an efficient allocation for pilots, among other examples), among other examples.

Figure 6:
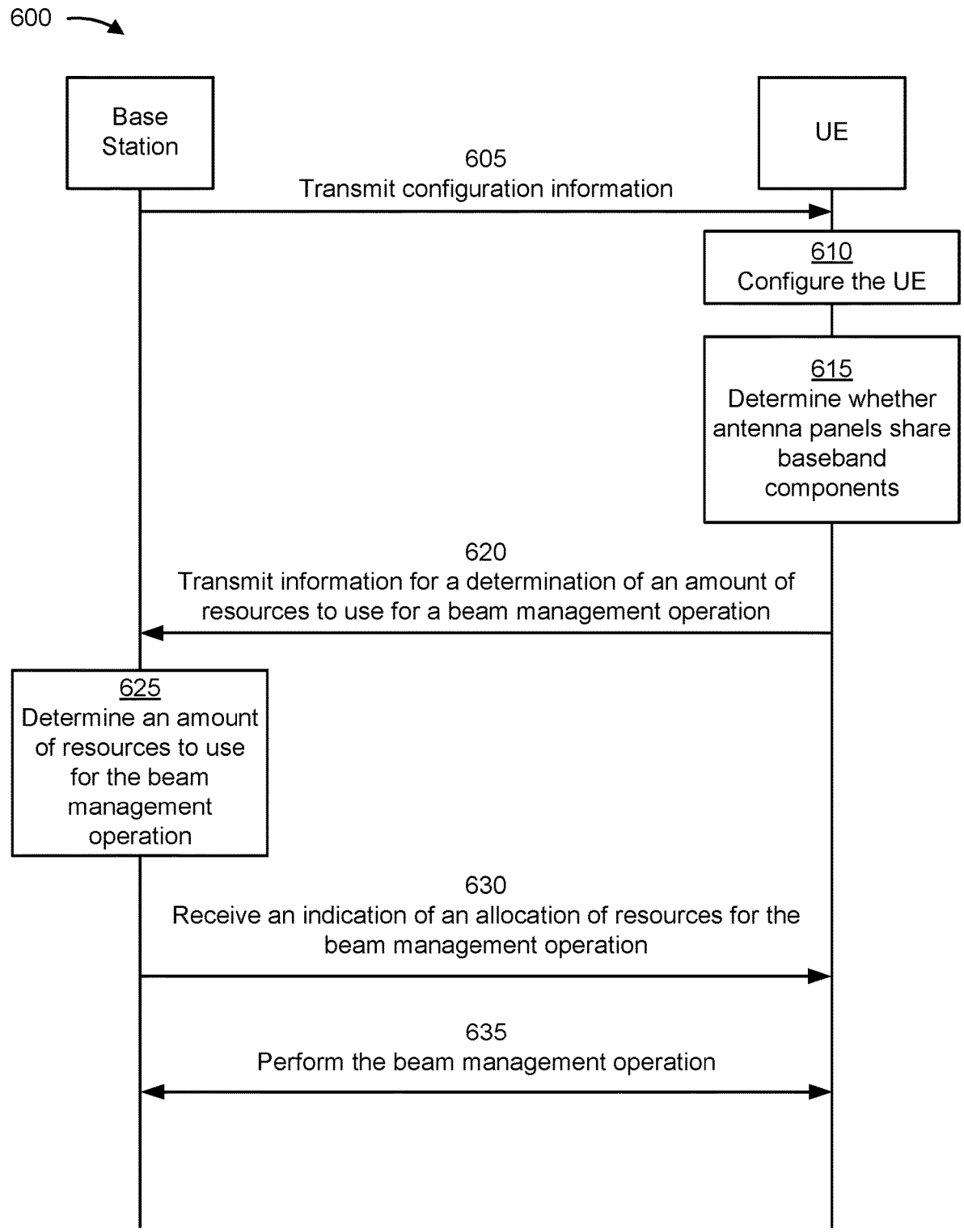
FIG. 6 is a diagram illustrating an example of an allocation of resources for beam management operations, in accordance with the present disclosure.

FIG. 6 is a diagram illustrating an example 600 associated with an allocation of resources for beam management operations, in accordance with the present disclosure. As shown in FIG. 6, a UE (e.g., UE 120) may communicate with a base station (e.g., base station 110). The UE and the base station may be part of a wireless network (e.g., wireless network 100). In some aspects, the UE and the base station may perform one or more beam management procedures.

As shown by reference number 605, the base station may transmit, and the UE may receive, configuration information. In some aspects, the UE may receive configuration information from another device (e.g., from another base station and/or another UE) and/or a communication standard, among other examples. In some aspects, the UE may receive the configuration information via one or more of RRC signaling, MAC-CE signaling, or DCI signaling, and/or the UE may determine the configuration information from a communication standard, among other examples. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to determine whether antenna panels of the UE share baseband components. In some aspects, the configuration information may indicate that the UE is to transmit an indication of whether antenna panels of the UE share baseband components, a maximum number of antenna panels that share a same set of baseband components, and/or a number of beams associated with different antenna panels, among other examples. In some aspects, the configuration information may indicate that the UE is to transmit an indication of a recommended amount of resources for the beam management operation, and/or an indication of an amount of resources requested for one or more antenna panels, among other examples.

In some aspects, the configuration information may indicate that the UE is to receive an indication of an allocation of resources for the beam management operation. In some aspects, the configuration information may indicate that the UE is to determine which antenna panels to use to transmit and/or receive reference signals associated with the allocation of resources, based at least in part on which antenna panels share baseband components (e.g., to determine to simultaneously use a set of the allocation of resources for transmission and/or reception of reference signals via multiple antenna panels that do not share baseband components).

As shown by reference number 610, the UE may configure the UE for communicating with the base station. In some aspects, the UE may configure the UE based at least in part on the configuration information. In some aspects, the UE may be configured to perform one or more operations described herein.

As shown by reference number 615, the UE may determine whether antenna panels share baseband components. In some aspects, the UE may determine which baseband components are shared among a highest number of antenna panels. For example, the UE may determine that a first set of baseband components are shared by two antenna panels and that a second set of baseband components are shared by three antenna panels. The UE may use this information to determine a number of antenna panels to recommend for time division multiplexing for transmitting and/or receiving reference signals. For example, the UE may determine to recommend using time division multiplexing (e.g., non-simultaneous transmission and/or reception) for three antenna panels based at least in part on the second set of baseband components being shared by three antenna panels.

In some aspects, the UE may determine a number of beams (e.g., UE receive beams and/or UE transmit beams) associated with each of the antenna panels. In some aspects, the UE may determine an amount of resources needed to receive reference signals (e.g., a repetition of a reference signal) via each beam of each antenna panel that shares a same set of baseband components.

As shown by reference number 620, the UE may transmit, and the base station may receive, information for a determination of an amount of resources to use for a beam management operation. In some aspects, the UE may transmit, and the base station may receive, the information via uplink control information (UCI) signaling, MAC-CE signaling, and/or RRC signaling, among other examples.

In some aspects, the information may be based at least in part on whether a first antenna panel and a second antenna panel share baseband components. In some aspects, the information may include an indication that the first antenna panel (e.g., associated with a first antenna panel identifier) and the second antenna panel (e.g., associated with a second antenna panel identifier) share the baseband components, an indication of a number of antenna panels of the UE that share the baseband components, and/or an indication of a recommended amount of resources for the beam management operation, among other examples.

In some aspects, the UE may transmit (e.g., within the information, with the information, and/or independently from the information) an indication of a number of beams associated with the first antenna panel and/or an indication of a number of beams associated with the second antenna panel, among other examples. In some aspects, the UE may transmit (e.g., within the information, with the information, and/or independently from the information) an indication of a recommended amount of resources for the first antenna panel and/or an indication of a recommended amount of resources for the second antenna panel, among other examples.

As shown by reference number 625, the base station may determine an amount of resources to use for the beam management operation (e.g., to allocate for the beam management operation), based at least in part on the information. In some aspects, the base station may accept a recommendation of an amount of resources for the beam management operation, as indicated within the information. In some aspects, the base station may determine an amount of resources (e.g., associated with a number of repetitions) dynamically.

In some aspects, the base station may determine the amount of resources based at least in part on an indication of a number of antenna panels of the UE that share baseband components. In some aspects, the base station may determine an amount of resources to allocate for the beam management operation based at least in part on a combination of the number of antenna panels of the UE that share the baseband components and a configured amount of resources to use per antenna panel. In some aspects, the base station may determine an amount of resources to allocate for the beam management operation based at least in part on a combination of a number of beams associated with the first antenna panel and the number of beams associated with a second antenna panel that shares baseband components with the first antenna panel.

In some aspects, the beam management operation may include one or more beam management operations described relative to FIG. 3 or 4, among other examples. For example, the beam management operation may include a downlink beam refinement operation (e.g. a P3 beam management operation or a third downlink beam management procedure and/or a downlink receive beam refinement operation) associated with one or more UE receiver beams, an uplink beam selection operation associated with one or more UE transmitter beams (e.g. a U1 beam management operation and/or a first uplink beam management procedure), and/or an uplink beam refinement operation associated with one or more UE transmitter beams (e.g. a U2 beam management operation or a second uplink beam management operation or uplink transmit beam refinement operation), among other examples.

As shown by reference number 630, the UE may receive, and the base station may transmit, an indication of an allocation of resources for the beam management operation. In some aspects, the indication of the allocation may be associated with one or more beam management operations. In some aspects, the indication of the allocation may be included in beam management configuration signaling (e.g., a channel state information (CSI) report configuration). In some aspects, the indication of the allocation may include an indication of an allocation of resources for reception of downlink reference signals, transmitted with repetition, via antenna panels of the UE (e.g., the first antenna panel and/or the second antenna panel). In some aspects, the indication of the allocation may include an indication of an allocation of resources for transmission of uplink reference signals via antenna panels of the UE, transmitted with repetition, (e.g., the first antenna panel and/or the second antenna panel).

As shown by reference number 635, the UE and the base station may perform the beam management operation. The UE beam management operation may include, or be included in, a beam management procedure (e.g., a beam management procedure of FIG. 3 and/or a beam management procedure of FIG. 4, among other examples). In some aspects, the UE may transmit and/or receive one or more reference signals (e.g., CSI-RSs, SRSs, and/or SSBs, among other examples) to simultaneously receive and/or transmit (e.g., one or more reference signals and/or one or more repetitions of a reference signal) via multiple antenna panels that do not share baseband components. In some aspects, the UE may transmit and/or receive one or more reference signals using time division multiplexing to receive and/or transmit via multiple antenna panels that share baseband components transmit.

In this way, the base station may allocate resources (e.g., dynamically and/or on a UE-specific basis) for the beam management operations based at least in part on a capability of the UE to simultaneously receive and/or transmit reference signals using multiple antenna panels. Based at least in part on the base station allocating an amount of resources for beam management that is based at least in part on whether the antenna panels of the UE share baseband components and/or whether the UE is configured to simultaneously transmit and/or receive reference signals via different antenna panels, the base station may conserve network resources allocated for beam management operations. This may facilitate a decreased periodicity (e.g., a decreased interval between iterations) of beam management procedures. A decreased periodicity may result in communicating with one or more beams that were selected using updated measurements of reference signals, which may reduce communication errors and/or improve spectral efficiency (e.g., based at least in part on using an efficient MCS and/or an efficient allocation for pilots, among other examples), among other examples.

Figure 7:
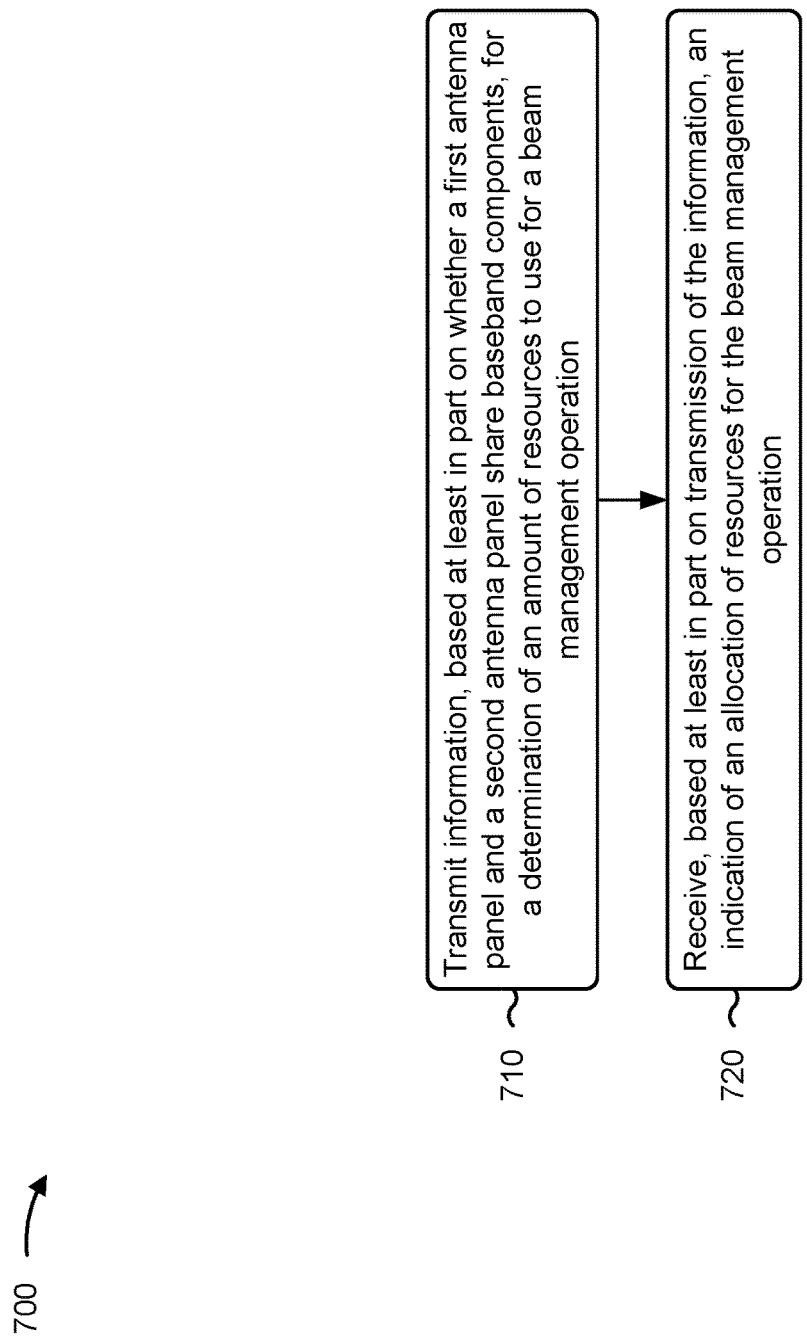
FIGS. 7 and 8 are diagrams illustrating example processes associated with an allocation of resources for beam management operations, in accordance with the present disclosure.

FIG. 7 is a diagram illustrating an example process 700 performed, for example, by a UE, in accordance with the present disclosure. Example process 700 is an example where the UE (e.g., UE 120) performs operations associated with an allocation of resources for beam management operations.

As shown in FIG. 7, in some aspects, process 700 may include transmitting information, based at least in part on whether a first antenna panel and a second antenna panel share baseband components, for a determination of an amount of resources to use for a beam management operation (block 710). For example, the UE (e.g., using transmission component 904, depicted in FIG. 9) may transmit information, based at least in part on whether a first antenna panel and a second antenna panel share baseband components, for a determination of an amount of resources to use for a beam management operation, as described above.

As further shown in FIG. 7, in some aspects, process 700 may include receiving, based at least in part on transmission of the information, an indication of an allocation of resources for the beam management operation (block 720). For example, the UE (e.g., using reception component 902, depicted in FIG. 9) may receive, based at least in part on transmission of the information, an indication of an allocation of resources for the beam management operation, as described above.

Process 700 may include additional aspects, such as any single aspect or any combination of aspects described below and/or in connection with one or more other processes described elsewhere herein.

In a first aspect, the information comprises an indication that the first antenna panel, associated with a first antenna panel identifier, and the second antenna panel, associated with a second antenna panel identifier, share the baseband components.

In a second aspect, alone or in combination with the first aspect, the information comprises an indication of a number of antenna panels of the UE that share the baseband components.

In a third aspect, alone or in combination with one or more of the first and second aspects, the information comprises an indication of a recommended amount of resources for the beam management operation.

In a fourth aspect, alone or in combination with one or more of the first through third aspects, process 700 includes transmitting one or more of an indication of a number of beams associated with the first antenna panel, an indication of a number of beams associated with the second antenna panel, an indication of a recommended amount of resources for the first antenna panel, or an indication of a recommended amount of resources for the second antenna panel.

In a fifth aspect, alone or in combination with one or more of the first through fourth aspects, transmitting the information comprises transmitting the information via one or more of UCI signaling, MAC-CE signaling, or RRC signaling.

In a sixth aspect, alone or in combination with one or more of the first through fifth aspects, the beam management operation comprises a downlink beam refinement operation associated with one or more UE receiver beams.

In a seventh aspect, alone or in combination with one or more of the first through sixth aspects, the indication of the allocation of resources for the beam management operation comprises an indication of an allocation of resources for reception of downlink reference signals, transmitted with repetition, via one or more of the first antenna panel or the second antenna panel.

In an eighth aspect, alone or in combination with one or more of the first through seventh aspects, the beam management operation comprises one or more of an uplink beam selection operation associated with one or more UE transmitter beams, or an uplink beam refinement operation associated with one or more UE transmitter beams.

In a ninth aspect, alone or in combination with one or more of the first through eighth aspects, the indication of the allocation of resources comprises an indication of an allocation of resources for transmission of uplink reference signals via one or more of the first antenna panel or the second antenna panel.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
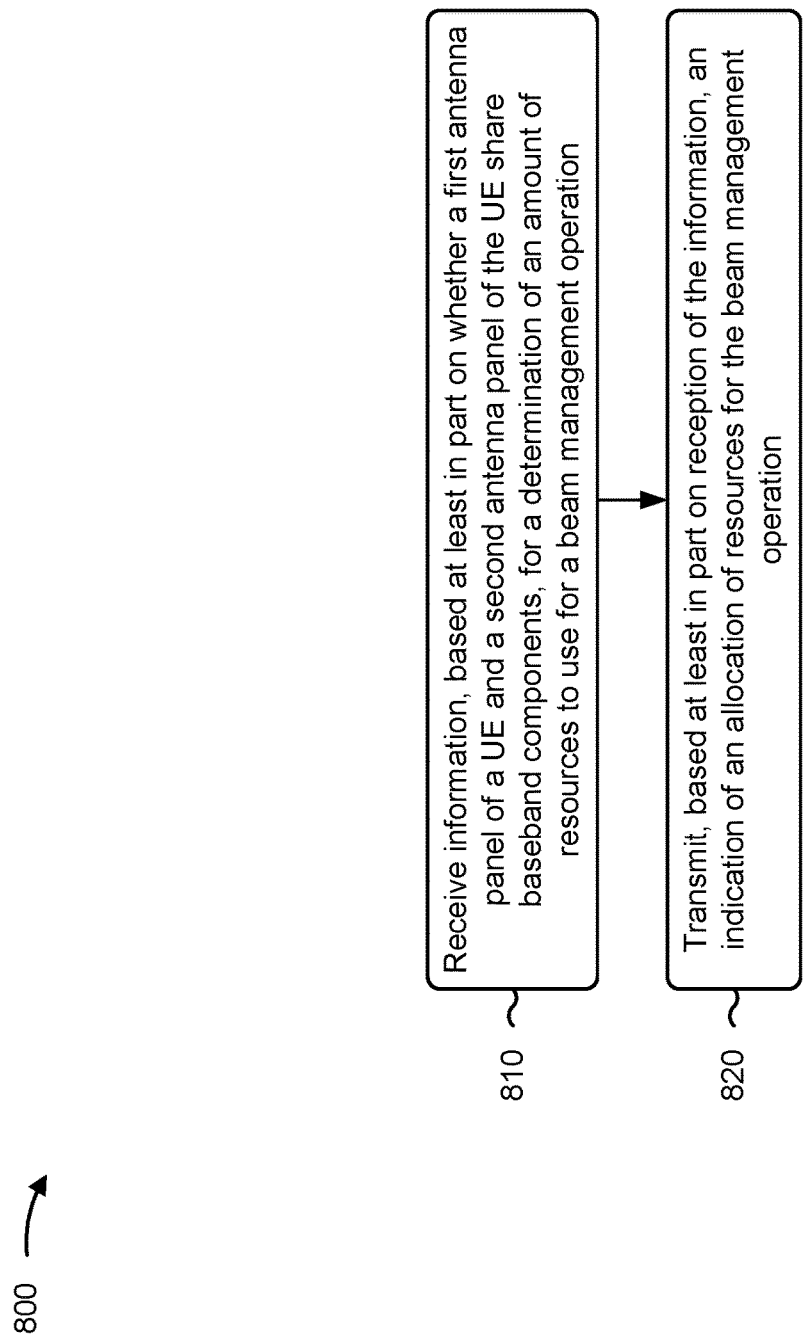

FIG. 8 is a diagram illustrating an example process 800 performed, for example, by a base station, in accordance with the present disclosure. Example process 800 is an example where the base station (e.g., base station 110) performs operations associated with an allocation of resources for beam management operations.

As shown in FIG. 8, in some aspects, process 800 may include receiving information, based at least in part on whether a first antenna panel of a UE and a second antenna panel of the UE share baseband components, for a determination of an amount of resources to use for a beam management operation (block 810). For example, the base station (e.g., using reception component 1002, depicted in FIG. 10) may receive information, based at least in part on whether a first antenna panel of a UE and a second antenna panel of the UE share baseband components, for a determination of an amount of resources to use for a beam management operation, as described above.

As further shown in FIG. 8, in some aspects, process 800 may include transmitting, based at least in part on reception of the information, an indication of an allocation of resources for the beam management operation (block 820).

For example, the base station (e.g., using transmission component 1004, depicted in FIG. 10) may transmit, based at least in part on reception of the information, an indication of an allocation of resources for the beam management operation, as described above.

Process 800 may include additional aspects, such as any single aspect or any combination of aspects described below and/or in connection with one or more other processes described elsewhere herein.

In a first aspect, process 800 includes determining, based at least in part on the information, an amount of resources to allocate for the beam management operation.

In a second aspect, alone or in combination with the first aspect, the information comprises an indication that the first antenna panel, associated with a first antenna panel identifier, and the second antenna panel, associated with a second antenna panel identifier, share the baseband components.

In a third aspect, alone or in combination with one or more of the first and second aspects, the information comprises an indication of a number of antenna panels of the UE that share the baseband components.

In a fourth aspect, alone or in combination with one or more of the first through third aspects, process 800 includes determining an amount of resources to allocate for the beam management operation based at least in part on a combination of the number of antenna panels of the UE that share the baseband components and a configured amount of resources to use per antenna panel.

In a fifth aspect, alone or in combination with one or more of the first through fourth aspects, the information comprises an indication of a recommended amount of resources for the beam management operation.

In a sixth aspect, alone or in combination with one or more of the first through fifth aspects, process 800 includes receiving one or more of an indication of a number of beams associated with the first antenna panel, an indication of a number of beams associated with the second antenna panel, an indication of an amount of resources requested for the first antenna panel, or an indication of an amount of resources requested for the second antenna panel.

In a seventh aspect, alone or in combination with one or more of the first through sixth aspects, process 800 includes determining an amount of resources, based at least in part on the information indicating that the first antenna panel and the second antenna panel share the baseband components, to allocate for the beam management operation based at least in part on a combination of the number of beams associated with the first antenna panel and the number of beams associated with the second antenna panel.

In an eighth aspect, alone or in combination with one or more of the first through seventh aspects, receiving the information comprises receiving the information via one or more of UCI signaling, MAC-CE signaling, or RRC signaling.

In a ninth aspect, alone or in combination with one or more of the first through eighth aspects, the beam management operation comprises a downlink beam refinement operation associated with one or more UE receiver beams.

In a tenth aspect, alone or in combination with one or more of the first through ninth aspects, the indication of the allocation of resources for the beam management operation comprises an indication of an allocation of resources for reception of reference signals, transmitted with repetition, via one or more of the first antenna panel or the second antenna panel.

In an eleventh aspect, alone or in combination with one or more of the first through tenth aspects, the beam management operation comprises one or more of an uplink beam selection operation associated with one or more UE transmitter beams, or an uplink beam refinement operation associated with one or more UE transmitter beams.

In a twelfth aspect, alone or in combination with one or more of the first through eleventh aspects, the indication of the allocation of resources comprises an indication of an allocation of resources for transmission of uplink reference signals via one or more of the first antenna panel or the second antenna panel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
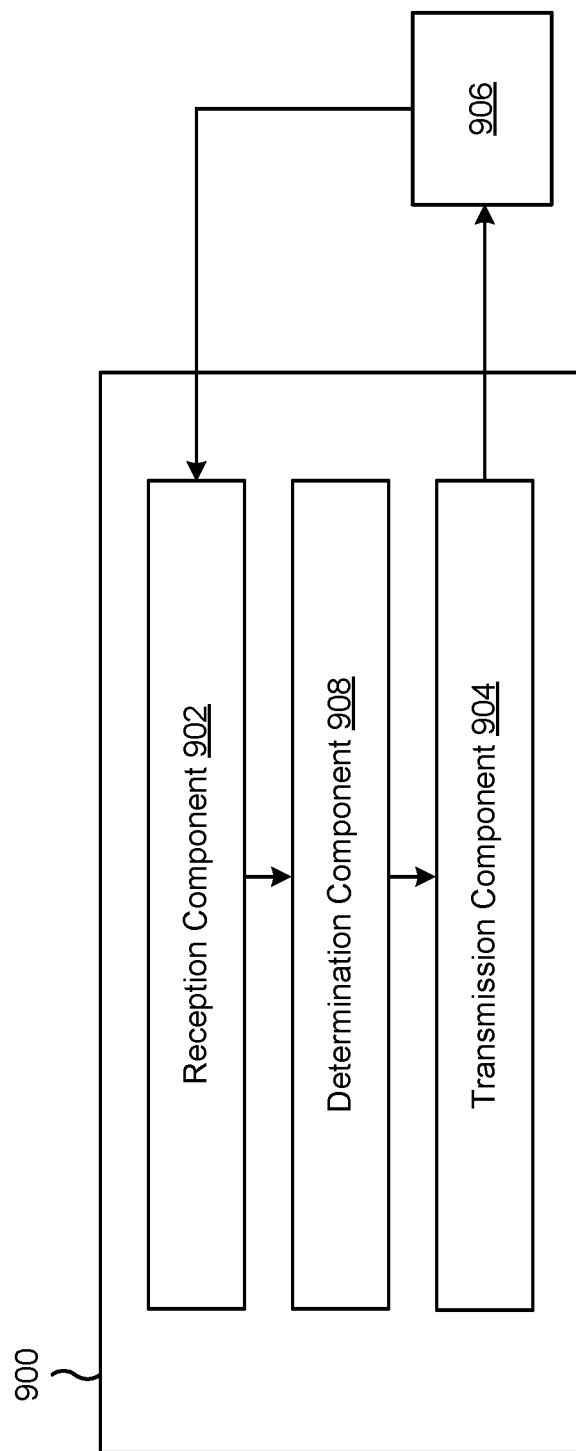
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIGS. 3-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The transmission component 904 may transmit information, based at least in part on whether a first antenna panel and a second antenna panel share baseband components, for a determination of an amount of resources to use for a beam management operation. The reception component 902 may receive, based at least in part on transmission of the information, an indication of an allocation of resources for the beam management operation.

The transmission component 904 may transmit one or more of an indication of a number of beams associated with the first antenna panel, an indication of a number of beams associated with the second antenna panel, an indication of a recommended amount of resources for the first antenna panel, or an indication of a recommended amount of resources for the second antenna panel.

The determination component 908 may determine whether antenna panels share baseband components. The determination component 908 may determine antenna panels and/or beams to use to transmit and/or receive reference signals associated with the beam management operation.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
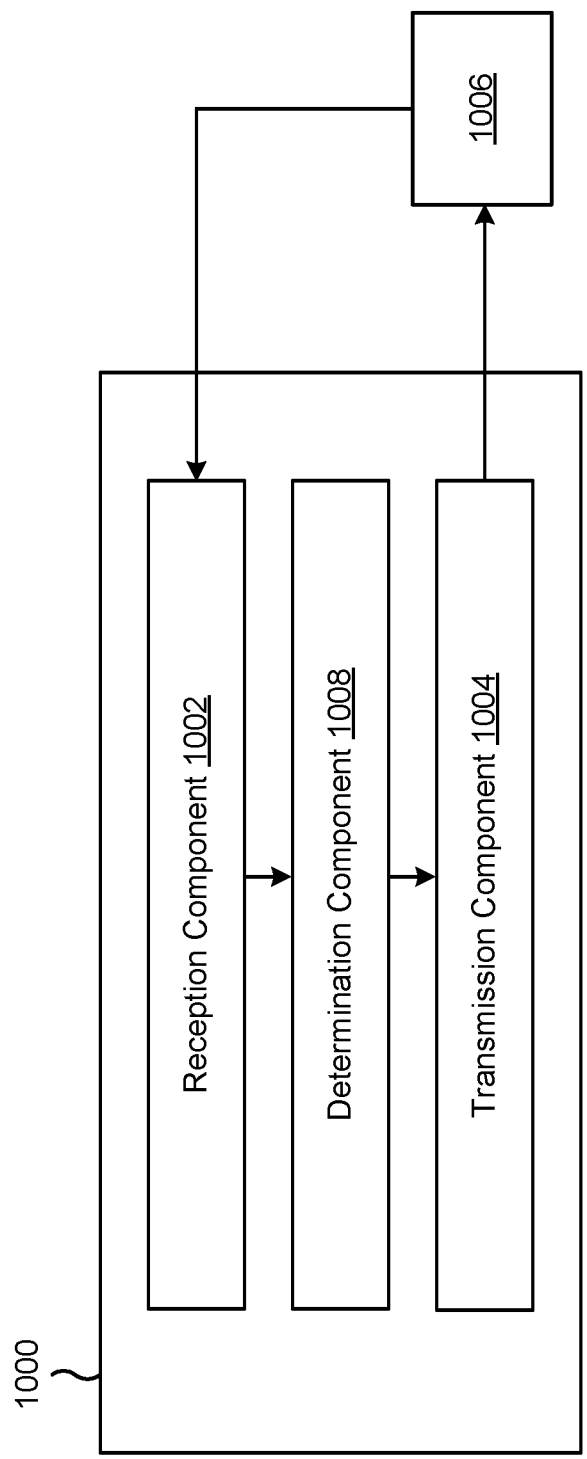

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008.

In some aspects, the apparatus 1000 may be configured to perform one or more operations described herein in connection with FIGS. 3-6. Additionally, or alternatively, the apparatus 1000 may be configured to perform one or more processes described herein, such as process 800 of FIG. 10.

In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The reception component 1002 may receive information, based at least in part on whether a first antenna panel of a UE and a second antenna panel of the UE share baseband components, for a determination of an amount of resources to use for a beam management operation. The transmission component 1004 may transmit, based at least in part on reception of the information, an indication of an allocation of resources for the beam management operation.

The determination component 1008 may determine, based at least in part on the information, an amount of resources to allocate for the beam management operation.

The determination component 1008 may determine an amount of resources to allocate for the beam management operation based at least in part on a combination of the number of antenna panels of the UE that share the baseband components and a configured amount of resources to use per antenna panel.

The reception component 1002 may receive one or more of an indication of a number of beams associated with the first antenna panel, an indication of a number of beams associated with the second antenna panel, an indication of an amount of resources requested for the first antenna panel, or an indication of an amount of resources requested for the second antenna panel.

The determination component 1008 may determine an amount of resources, based at least in part on the information indicating that the first antenna panel and the second antenna panel share the baseband components, to allocate for the beam management operation based at least in part on a combination of the number of beams associated with the first antenna panel and the number of beams associated with the second antenna panel.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of aspects of the present disclosure:

Aspect 1: A method of wireless communication performed by a user equipment (UE), comprising: transmitting information, based at least in part on whether a first antenna panel and a second antenna panel share baseband components, for a determination of an amount of resources to use for a beam management operation; and receiving, based at least in part on transmission of the information, an indication of an allocation of resources for the beam management operation.

Aspect 2: The method of aspect 1, wherein the information comprises: an indication that the first antenna panel, associated with a first antenna panel identifier, and the second antenna panel, associated with a second antenna panel identifier, share the baseband components.

Aspect 3: The method of any of aspects 1 through 2, wherein the information comprises: an indication of a number of antenna panels of the UE that share the baseband components.

Aspect 4: The method of any of aspects 1 through 3, wherein the information comprises: an indication of a recommended amount of resources for the beam management operation.

Aspect 5: The method of any of aspects 1 through 4, further comprising: transmitting one or more of: an indication of a number of beams associated with the first antenna panel, an indication of a number of beams associated with the second antenna panel, an indication of a recommended amount of resources for the first antenna panel, or an indication of a recommended amount of resources for the second antenna panel.

Aspect 6: The method of any of aspects 1 through 5, wherein transmitting the information comprises transmitting the information via one or more of: uplink control information signaling, one or more medium access control control element signaling, or radio resource control signaling.

Aspect 7: The method of any of aspects 1 through 6, wherein the beam management operation comprises: a downlink beam refinement operation associated with one or more UE receiver beams.

Aspect 8: The method of aspect 7, wherein the indication of the allocation of resources for the beam management operation comprises: an indication of an allocation of resources for reception of downlink reference signals, transmitted with repetition, via one or more of the first antenna panel or the second antenna panel.

Aspect 9: The method of any of aspects 1 through 8, wherein the beam management operation comprises one or more of: an uplink beam selection operation associated with one or more UE transmitter beams, or an uplink beam refinement operation associated with one or more UE transmitter beams.

Aspect 10: The method of aspect 9, wherein the indication of the allocation of resources comprises: an indication of an allocation of resources for transmission of uplink reference signals via one or more of the first antenna panel or the second antenna panel.

Aspect 11: A method of wireless communication performed by a base station, comprising: receiving information, based at least in part on whether a first antenna panel of a UE and a second antenna panel of the UE share baseband components, for a determination of an amount of resources to use for a beam management operation; and transmitting, based at least in part on reception of the information, an indication of an allocation of resources for the beam management operation.

Aspect 12: The method of aspect 11, further comprising: determining, based at least in part on the information, an amount of resources to allocate for the beam management operation.

Aspect 13: The method of any of aspects 11 through 12, wherein the information comprises: an indication that the first antenna panel, associated with a first antenna panel identifier and the second antenna panel, associated with a second antenna panel identifier, share the baseband components.

Aspect 14: The method of any of aspects 11 through 13, wherein the information comprises: an indication of a number of antenna panels of the UE that share the baseband components.

Aspect 15: The method of aspect 14, further comprising: determining an amount of resources to allocate for the beam management operation based at least in part on a combination of the number of antenna panels of the UE that share the baseband components and a configured amount of resources to use per antenna panel.

Aspect 16: The method of any of aspects 11 through 15, wherein the information comprises: an indication of a recommended amount of resources for the beam management operation.

Aspect 17: The method of any of aspects 11 through 16, further comprising: receiving one or more of: an indication of a number of beams associated with the first antenna panel, an indication of a number of beams associated with the second antenna panel, an indication of an amount of resources requested for the first antenna panel, or an indication of an amount of resources requested for the second antenna panel.

Aspect 18: The method of aspect 17, further comprising: determining an amount of resources, based at least in part on the information indicating that the first antenna panel and the second antenna panel share the baseband components, to allocate for the beam management operation based at least in part on a combination of the number of beams associated with the first antenna panel and the number of beams associated with the second antenna panel.

Aspect 19: The method of any of aspects 11 through 18, wherein receiving the information comprises receiving the information via one or more of: uplink control information signaling, one or more medium access control control element signaling, or radio resource control signaling.

Aspect 20: The method of any of aspects 11 through 19, wherein the beam management operation comprises: a downlink beam refinement operation associated with one or more UE receiver beams.

Aspect 21: The method of aspect 20, wherein the indication of the allocation of resources for the beam management operation comprises: an indication of an allocation of resources for reception of reference signals, transmitted with repetition, via one or more of the first antenna panel or the second antenna panel.

Aspect 22: The method of any of aspects 11 through 21, wherein the beam management operation comprises one or more of: an uplink beam selection operation associated with one or more UE transmitter beams, or an uplink beam refinement operation associated with one or more UE transmitter beams.

Aspect 23: The method of aspect 22, wherein the indication of the allocation of resources comprises: an indication of an allocation of resources for transmission of uplink reference signals via one or more of the first antenna panel or the second antenna panel.

Aspect 24: An apparatus for wireless communication at a first device, comprising a processor; memory coupled with the processor; and instructions stored in the memory and executable by the processor to cause the apparatus to perform a method of any of aspects 1 through 10.

Aspect 25: An apparatus for wireless communication at a first device, comprising at least one means for performing a method of any of aspects 1 through 10.

Aspect 26: A non-transitory computer-readable medium storing code for wireless communication at a first device, the code comprising instructions executable by a processor to perform a method of any of aspects 1 through 10.

Aspect 27: An apparatus for wireless communication at a first device, comprising a processor; memory coupled with the processor; and instructions stored in the memory and executable by the processor to cause the apparatus to perform a method of any of aspects 11 through 23.

Aspect 28: An apparatus for wireless communication at a first device, comprising at least one means for performing a method of any of aspects 11 through 23.

Aspect 29: A non-transitory computer-readable medium storing code for wireless communication at a first device, the code comprising instructions executable by a processor to perform a method of any of aspects 11 through 23.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   transmit information based at least in part on whether a first antenna panel and a second antenna panel share baseband components; and receive, based at least in part on transmission of the information, an indication of an allocation of resources associated with a number of repetitions.

2. The UE of claim 1, wherein the information comprises:
an indication that the first antenna panel, associated with a first antenna panel identifier, and the second antenna panel, associated with a second antenna panel identifier, share the baseband components.

3. The UE of claim 1, wherein the information comprises:
an indication of a number of antenna panels of the UE that share the baseband components.

4. The UE of claim 1, wherein the information comprises:
an indication of a recommended amount of resources for a beam management operation.

5. The UE of claim 1, wherein the one or more processors are further configured to:
transmit one or more of:
an indication of a number of beams associated with the first antenna panel,
an indication of a number of beams associated with the second antenna panel,
an indication of a recommended amount of resources for the first antenna panel, or
an indication of a recommended amount of resources for the second antenna panel.

6. The UE of claim 1, wherein the one or more processors, to transmit the information, are configured to transmit the information via one or more of:
uplink control information signaling,
one or more medium access control control element signaling, or
radio resource control signaling.

7. The UE of claim 1, wherein the information is associated with a beam management operation, the beam management operation comprising
a downlink beam refinement operation associated with one or more UE receiver beams.

8. The UE of claim 1, wherein the indication of the allocation of resources comprises:
an indication of an allocation of resources for reception of downlink reference signals, transmitted with repetition, via one or more of the first antenna panel or the second antenna panel.

9. The UE of claim 1, wherein the information is associated with a beam management operation, the beam management operation comprising one or more of:
an uplink beam selection operation associated with one or more UE transmitter beams, or
an uplink beam refinement operation associated with one or more UE transmitter beams.

10. The UE of claim 9, wherein the indication of the allocation of resources comprises:
an indication of an allocation of resources for transmission of uplink reference signals via one or more of the first antenna panel or the second antenna panel.

11. A base station for wireless communication, comprising:
a memory; and
one or more processors, coupled to the memory, configured to:
receive information based at least in part on whether a first antenna panel of a user equipment (UE) and a second antenna panel of the UE share baseband components; and
transmit, based at least in part on reception of the information, an indication of an allocation of resources associated with a number of repetitions.

12. The base station of claim 11, wherein the one or more processors are further configured to:
determine, based at least in part on the information, an amount of resources to allocate for a beam management operation.

13. The base station of claim 11, wherein the information comprises:
an indication that the first antenna panel, associated with a first antenna panel identifier and the second antenna panel, associated with a second antenna panel identifier, share the baseband components.

14. The base station of claim 11, wherein the information comprises:
an indication of a number of antenna panels of the UE that share the baseband components.

15. The base station of claim 14, wherein the one or more processors are further configured to:
determine an amount of resources to allocate for a beam management operation based at least in part on a combination of the number of antenna panels of the UE that share the baseband components and a configured amount of resources to use per antenna panel.

16. The base station of claim 11, wherein the information comprises:
an indication of a recommended amount of resources for a beam management operation.

17. The base station of claim 11, wherein the one or more processors are further configured to:
receive one or more of:
an indication of a number of beams associated with the first antenna panel,
an indication of a number of beams associated with the second antenna panel,
an indication of an amount of resources requested for the first antenna panel, or
an indication of an amount of resources requested for the second antenna panel.

18. The base station of claim 17, wherein the one or more processors are further configured to:
determine an amount of resources, based at least in part on the information indicating that the first antenna panel and the second antenna panel share the baseband components, to allocate for a beam management operation based at least in part on a combination of the number of beams associated with the first antenna panel and the number of beams associated with the second antenna panel.

19. The base station of claim 11, wherein the one or more processors, to receive the information, are configured to receive the information via one or more of:
uplink control information signaling,
one or more medium access control control element signaling, or
radio resource control signaling.

20. The base station of claim 11, wherein the information is associated with a beam management operation, the beam management operation comprising:
a downlink beam refinement operation associated with one or more UE receiver beams.

21. The base station of claim 11, wherein the indication of the allocation of resources comprises:
an indication of an allocation of resources for reception of reference signals, transmitted with repetition, via one or more of the first antenna panel or the second antenna panel.

22. The base station of claim 11, wherein the information is associated with a beam management operation, the beam management operation comprising one or more of:
- an uplink beam selection operation associated with one or more UE transmitter beams, or
- an uplink beam refinement operation associated with one or more UE transmitter beams.

23. The base station of claim 22, wherein the indication of the allocation of resources comprises:
- an indication of an allocation of resources for transmission of uplink reference signals via one or more of the first antenna panel or the second antenna panel.

24. A method of wireless communication performed by a user equipment (UE), comprising:
- transmitting information based at least in part on whether a first antenna panel and a second antenna panel share baseband components; and
- receiving, based at least in part on transmission of the information, an indication of an allocation of resources associated with a number of repetitions.

25. The method of claim 24, wherein the information comprises one or more of:
- an indication that the first antenna panel, associated with a first antenna panel identifier, and the second antenna panel, associated with a second antenna panel identifier, share the baseband components,
- an indication of a number of antenna panels of the UE that share the baseband components, or
- an indication of a recommended amount of resources for a beam management operation.

26. The method of claim 24, further comprising:
transmitting one or more of:
- an indication of a number of beams associated with the first antenna panel,
- an indication of a number of beams associated with the second antenna panel,
- an indication of a recommended amount of resources for the first antenna panel, or
- an indication of a recommended amount of resources for the second antenna panel.

27. A method of wireless communication performed by a base station, comprising:
- receiving information based at least in part on whether a first antenna panel of a user equipment (UE) and a second antenna panel of the UE share baseband components; and
- transmitting, based at least in part on reception of the information, an indication of an allocation of resources associated with a number of repetitions.

28. The method of claim 27, wherein the information comprises:
- an indication that the first antenna panel, associated with a first antenna panel identifier and the second antenna panel, associated with a second antenna panel identifier, share the baseband components,
- an indication of a number of antenna panels of the UE that share the baseband components, or
- an indication of a recommended amount of resources for a beam management operation.

29. The method of claim 27, further comprising:
receiving one or more of:
- an indication of a number of beams associated with the first antenna panel,
- an indication of a number of beams associated with the second antenna panel,
- an indication of an amount of resources requested for the first antenna panel, or
- an indication of an amount of resources requested for the second antenna panel.

30. The method of claim 27, wherein information is associated with a beam management operation, the beam management operation comprising one or more of:
- a downlink beam refinement operation associated with one or more UE receiver beams,
- an uplink beam selection operation associated with one or more UE transmitter beams, or
- an uplink beam refinement operation associated with one or more UE transmitter beams.

\* \* \* \* \*